United States Patent [19]
Brown

[11] Patent Number: 5,631,950
[45] Date of Patent: May 20, 1997

[54] TRANSMISSION OF DATA MESSAGE DURING SILENT INTERVALS OF RINGING FOR SELECTION OF TERMINAL EQUIPMENT

[75] Inventor: Edwin Z. Brown, Westminster, Colo.

[73] Assignee: Lucent Technologies Inc., Murray Hill, N.J.

[21] Appl. No.: 507,617

[22] Filed: Jul. 26, 1995

[51] Int. Cl.$^6$ .............................. H04M 1/57; H04M 3/02; H04M 11/00
[52] U.S. Cl. .......................... 379/67; 379/106; 379/142; 379/246; 379/373; 379/386
[58] Field of Search .................................. 379/142, 107, 379/106, 105, 96, 201, 100, 67, 88, 245, 246, 247, 93, 373, 386

[56] References Cited

U.S. PATENT DOCUMENTS

| | | | |
|---|---|---|---|
| 4,551,581 | 11/1985 | Doughty | 379/94 |
| 4,567,323 | 1/1986 | Lottes et al. | 379/201 |
| 4,582,956 | 4/1986 | Doughty | 379/94 |
| 4,961,217 | 10/1990 | Akiyama | 379/89 |
| 5,063,588 | 11/1991 | Patsiokas et al. | 379/57 |
| 5,228,080 | 7/1993 | Nutter et al. | 379/373 |
| 5,396,548 | 3/1995 | Bayerl et al. | 379/140 |
| 5,467,390 | 11/1995 | Brankley et al. | 379/229 |
| 5,479,493 | 12/1995 | Baker et al. | 379/127 |
| 5,497,414 | 3/1996 | Bartholomew | 379/142 |

Primary Examiner—Thomas W. Brown
Attorney, Agent, or Firm—John C. Moran

[57] ABSTRACT

Allowing a calling party to enter a message that is transmitted on a destination telephone link during silent intervals of a ringing signal by a switching office. In a first embodiment, the destination telephone link is equipped with the feature of allowing receipt of calling party specified data messages. The switching office automatically accepts information for a data message as dialed digits from the calling party. In a second embodiment, the switching office designates that an originating telephone link can transmit information for a data message. The switching office is responsive to the transmitted information to form a data message and to transmit this data message on a destination telephone link during the silent intervals of the ringing cycles. In a third embodiment, in response to a calling party placing a call to a special telephone number, the switching office requests that the calling party enter a destination telephone number and information for a data message. In another implementation of the third embodiment, the switching office transfers the call to an adjunct system that receives the destination telephone number and information for a data message. Then, the adjunct system requests that the switching office set up a call between the calling party and an identified telephone link and transmit the data message on the identified telephone link during the silent intervals of the ringing cycles. In a fourth embodiment, the switching office is responsive to called party information and data message information in a setup message received from an ISDN telephone link to establish a call between the ISDN telephone link and a telephone link identified by the called party information. Further, the switching office is responsive to the data message information to form a data message and to transmit the data message on the identified telephone link during the silent intervals of the ringing cycles.

30 Claims, 6 Drawing Sheets

TRANSMISSION OF DATA MESSAGE DURING SILENT INTERVALS OF RINGING FOR SELECTION OF TERMINAL EQUIPMENT

CROSS-REFERENCE TO RELATED APPLICATION

E. Z. Brown 4, "Selection of Terminal Equipment in Response to a Data Message Received During Intervals of Ringing", U.S. patent application Ser. No. 08/507,622, filed Jul. 26, 1995.

The above application is being filed concurrently with the present application and assigned to the same assignee.

1. Technical Field

This invention relates to telecommunication systems and, in particular, to the transmission of data messages that are specified by users in incoming calls to the telecommunications systems.

2. Background of the Invention

The ability to send display and data messages during the silent intervals between the ring signal going to a telephone is set forth in U.S. Pat. No. 4,551,581. This capability has been restricted to informing the user of a destination telephone of origination information of the incoming call using only a display message. This display message is often referred to as caller ID or incoming calling line identification (ICLID). A variety of uses have been made of the identification of the calling party or telephone. This information has been utilized to speak the name of the calling party utilizing a voice synthesizer, and it has been used to only allow incoming calls from destinated parties to cause the destination telephone to ring during specified periods of a day. U.S. Pat. No. 5,228,080 utilizes one of the predetermined messages that may be sent out by the central office for identifying an incoming call. These predetermined messages are "long distance" and "private". U.S. Pat. No. 5,228,080 discloses the utilization of the predetermined message "private" to not allow the destination phone to ring when this predetermined message is received. U.S. Pat. No. 5,228,080 also discloses replying with a predetermined voice message if a "private" message is received. The central office will generate the "private" message if a call is from a telephone which has been designated that all calls from that telephone should be marked as private. In addition, certain central offices allow a calling party to dial a set of special digits before dialing the destination telephone number. In response to the special digits, the central office will transmit the "private" message to the destination telephone.

Whereas, the prior art discloses a number of uses for the ICLID display message for specifying the calling party, the prior art is limited to using these display messages only for identifying calling party or specifying a type of calling party. The calling party has no capability to send data messages that are not predetermined by the central office. This inability means that the full data messaging capability of a central office is not being utilized.

SUMMARY OF THE INVENTION

The foregoing problems are solved, and a technical advance is achieved by an apparatus and method in a switching office that allow a calling party to enter a message that is transmitted on a destination telephone link during silent intervals of a ringing signal. In a first embodiment, the destination telephone link is equipped with the feature of allowing receipt of calling party specified data messages. After the dialing of the destination telephone number by the calling party, the switching office sends an indication to the calling party that the destination telephone link is equipped to receive a data message. Then, the switching office automatically accepts information for a data message as dialed digits from the calling party. In response to the telephone number and dialed digits, the switching office sets up a call between the calling party and the telephone link identified by the destination telephone number and sends the data message on the identified telephone link during ringing. The indication may be a tone or a voice message.

In a second embodiment, the switching office designates that an originating telephone link can transmit information for a data message. The switching office is responsive to the transmitted information to form a data message and to transmit this data message on the destination telephone link during ringing. It is a user of the originating telephone links responsibility to know that terminals connected to the destination telephone link can receive the data message.

In a third embodiment, in response to a calling party placing a call to a special telephone number, the switching office requests that the calling party enter a destination telephone number and information for a data message. In response to receipt of the destination telephone number and information, the switching office sets up a call between the calling party and a telephone link identified by the destination telephone number and sends a data message on the identified telephone link during ringing. In another implementation of the third embodiment, the switching office transfers the call to an adjunct system that receives the destination telephone number and information for a data message. Then, the adjunct system requests that the switching office set up a call between the calling party and identified telephone link and transmit the data message on the identified telephone link during ringing.

In a fourth embodiment, the switching office is responsive to called party information and data message information in a setup message received from an ISDN telephone link to establish a call between the ISDN telephone link and a telephone link identified by the called party information. Further, the switching office is responsive to the data message information to form a data message and to transmit the data message on the identified telephone link during ringing.

DETAILED DESCRIPTION

Figure 1:
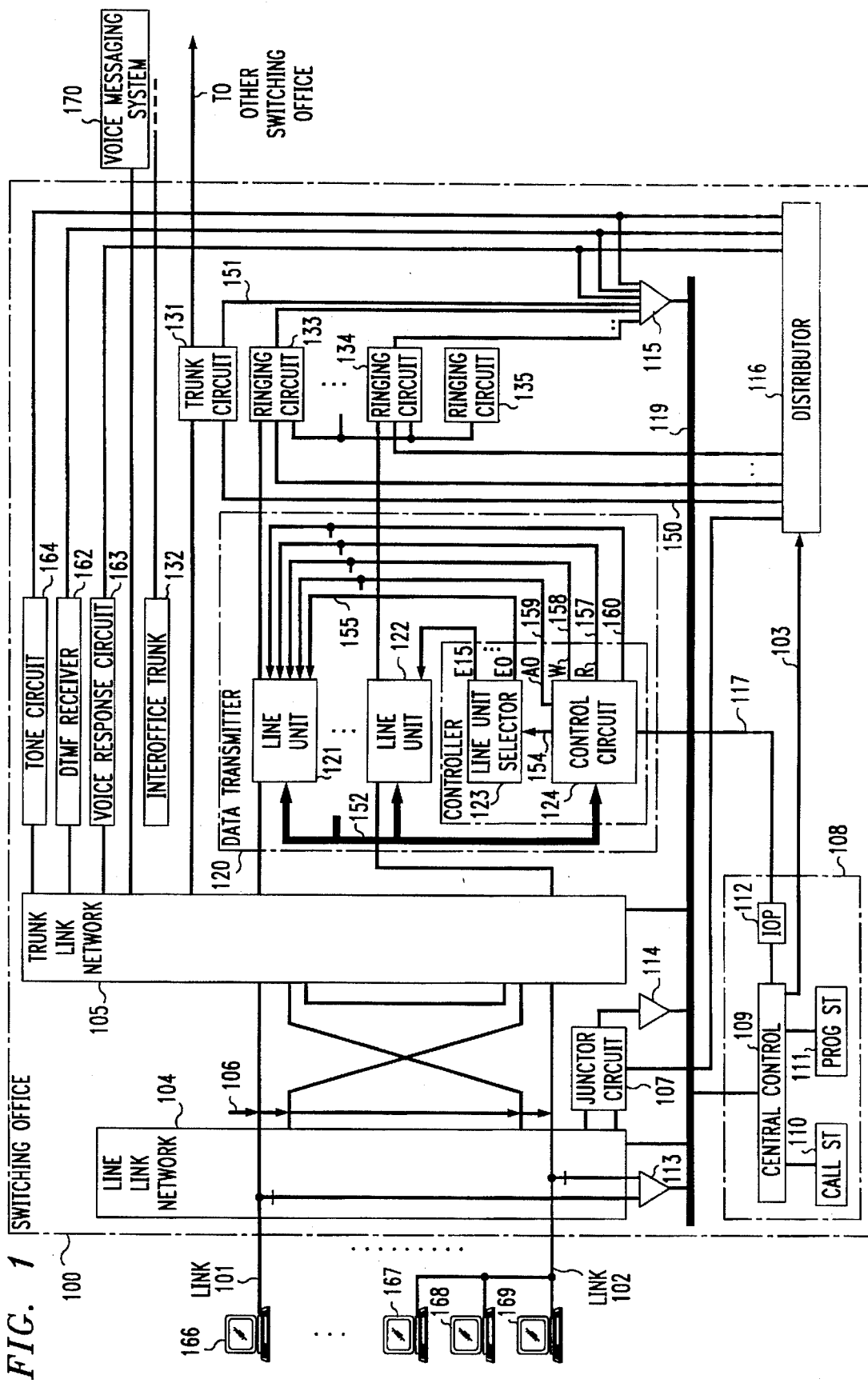
FIG. 1 illustrates, in block diagram form, a switching office in accordance with the invention.

FIG. 1 illustrates switching office 100 that is interconnected to terminal 166 via telephone link 101 and interconnected to terminals 167–169 via telephone link 102. Switching office 100 has a plurality of telephone links such as telephone link 101 terminating on line link network 104. By way of example, switching office 100 is suitably an electronic program controlled switching system of the type disclosed in U.S. Pat. No. 3,570,008, R. W. Downing, et al. It is also disclosed in the Bell System Technical Journal, V.43, No. 5, parts 1 and 2, September, 1964. Switching office 100 may also be the AT&T 5ESS Switching System disclosed in the AT&T Technical Journal, V.64, No. 6, July- August 1985. Switching office 100 comprises line link network 104, trunk link network 105, and a stored program controlled processor 108. Line link network 104 provides the termination for telephone links such as 101 and 102, while trunk link network 105 provides termination for interoffice trunks such as 132 which is terminated at switch office 100 via trunk circuit 131. The trunk line network also provides termination for ringing circuits such as ringing circuit 133, tone circuit 164, dual tone multi-frequency (DTMF) receiver 162, and voice response system 163. Under control of central processor 108, any customer may be selectively connected through the line and trunk link network to a ringing circuit which transmits intermittent ringing signals to the connected station. At the start of ringing and between each pair of ringing signals is a silent interval or, more particularly, a period of time during which a ringing signal is not present. Consequently, a called station commonly receives a two second burst of a 20 Hz ringing signal followed by four seconds of silence. This sequence of ringing and silence is normally repeated until the customer at the called station answers or the caller abandons the call. Connected to each of the ringing circuits is ringing source 135 for generating the ringing signals. Coupling the ringing signal to the trunk link network is data transmitter 120 which sends data messages from processor 108 to the connected station during the silent interval between ringing signals. These messages are received from a customer using a terminal such as terminal 166 either as DTMF digits or as an ISDN message. The line and trunk link networks are interconnected via wire junctors 106 to permit the interconnection of lines, trunks, and service circuits for call processing under control of processor 108. Line link network 104 is also interconnected by junctor circuits such as 107 to complete the supervision of intra-office calls.

The majority of the logic, controls, storage, supervisory, and translation functions required for the operation of switching system 100 are performed by central processor 108. Central processor 108 comprises central control 109, call store 110, program store 111, and input/output processor 112. Call store 110 is a memory for storing translation and routing information in addition to temporary information relating to calls in progress and special services. Program store 111 is a memory for storing program instructions for central control 109. Central control 109 is the information processing unit of the system that executes the program instruction stored in program store 111 using information stored in call store 110. Input/output processor 112 interfaces with peripheral units such as data transmitter 120 via serial data links. For example, in response to a message from central control 109, I/O processor 112 sends that message to data transmitter 120 via serial data link 117. Central processor 108 interfaces with lines, trunks, and service circuits via scanners 113 through 115 and distributor 116. Scanners 113 through 115 are used to gather information for processor 108. For example, scanners 113 and 114 recognize off-hook/ on-hook conditions for the telephone links or receive ISDN setup messages which are then transferred to processor 108 for processing.

Data transmitter 120 sends a data message from central processor 108 to a selected on-hook station during the silent interval before or between ringing signals. Data transmitter 120 comprises a plurality of line units such as 121 and 122 and controller 125 which comprises line unit selector 123 and control circuit 124. Line unit 121 connects the tip and ring leads of ringing circuit 133 to terminations on trunk line network 105 which are selectively connected to the tip and ring leads of a called telephone link. Thus coupled to the tip and ring leads of the ringing circuit 133 and the called line link, line unit 121 transmits the data message to the terminal terminating the telephone link using well known frequency shift keying and signalling. The frequency shift keyed signal is received from controller circuit 124 via data bus 152. Line unit 121 is selected to receive this information in response to an enabling signal from line unit selector 123. Control circuit 124 is the processing unit of data transmitter 120. Greater details on the operation of data transmitter 120 are set forth in U.S. Pat. No. 4,551,581 which is hereby incorporated by reference. The details on how a message received by control circuit 124 from central processor 108 is transmitted on a selected telephone link during the silent intervals of the ringing signals are also disclosed in U.S. Pat. No. 4,551,581 in greater detail.

Switching office 100 provides four mechanisms that allow a calling link to transmit a data message to the called link during the silent intervals of the ringing signals. First, the called link can be defined as having the messaging service by translation tables maintained by central control 109 in call store 110 for that called link. When a calling terminal places a call to this called link, the switching office 100 has the following methods to handle that call. In the first method, switching office 100 can respond to the dialed destination digits by transmitting a tone back to the calling terminal indicating that the calling terminal can send DTMF digits which will then be transmitted on the called link. In the second method, central processor 108 can inform the calling terminal of the availability of the feature by utilizing voice response circuit 163 to send an audio message to the calling terminal. In addition, the voice message could also indicate the types of terminals associated with the called link. For example, if the called link is link 102, voice response circuit 163 under control of central processor 108 defines to the calling terminal the identity of terminals 167 through 169 and the digits that will select each of these terminals. Assuming that terminal 167 is a telephone, that terminal 168 is a fax machine, and that terminal 169 is an answering machine, if either the fax machine or answering machine recognizes their digit in the data message, they immediately answer the call before ringing is transmitted on link 102. This allows the transmission of the fax or voice message without terminal 167 being rung. In the third method, central processor 108 simply accepts digits from terminal 166 and transfers those digits automatically as a data message on link 102.

Using any of the three methods of this first mechanism, a telephone company can offer multiple extensions service off of a single telephone link. Assume that terminals 167–169 are telephones. Each telephone responds to a particular digit in the data message to allow ringing of that telephone. Hence, a caller transmits the digit for terminal 168 and only terminal 168 rings. A further extension of this idea is that terminal 168 (if it was selected) rings for some predetermined time after which terminals 167 and 169 begin ringing.

A second mechanism that switching office 100 may use to accept a data message is by specifying for a telephone link that it has the capability of transmitting a data message to switching office 100. Any data message received by switching office 100 from such a link is blindly transmitted out on the called link. This second mechanism is utilized for example by a public utility company to read the electrical meters in its customers houses. Assuming that terminal 166 represents the public utility company's computer, and link 102 is providing service to a residence. Further, assume that terminal 169 has a modem which is controlled by a microprocessor capable of reading power usage from an electrical meter. During the night, the public utility company's computer 166 during the night places a call to telephone link 102 and transmits the digit to select terminal 169. Terminal 169 immediately responds to its identifying digit in the message before ringing takes place. The microprocessor then using the internal modem transmits the power usage to the computer in terminal 166. An important fact is that the public utility company does not have to have a separate telephone link to each residence. Further, if the customer should pick up the telephone during the data transfer via the modem, the computer in terminal 166 realizes this because of the corruption of data and immediately abandons the call. In addition, little time is required to transfer the power usage information from terminal 169 to the computer in terminal 166. In this second mechanism for transmitting a data message on a called link, it is the calling terminal's responsibility to know that the called telephone link has a terminal or terminals that can respond to these data messages.

The third mechanism for switching office 100 to accept data messages from a calling terminal is to have a special telephone number that a caller calls when they wish to send a data message to a particular telephone link. In the first method of implementing the third mechanism, central processor 108 is responsive to terminal 166 dialing the special telephone number to answer the call and to switch the call to voice response circuit 163. Voice response circuit 163 plays a message to the caller explaining that they have the option of sending digits in a data message to the called link and defining what these digits do. The caller then dials in the telephone number of the called link. Central processor 108 receives these digits via DTMF receiver 116 as well as the subsequent digit or digits that are to be included in the data message. Central processor 108 then transfers the data message to data transmitter 120 and sets up the internal network to interconnect the calling terminal to the called telephone link.

The second method to provide this third mechanism is to utilize an adjunct system such as voice messaging system 170. When terminal 166 transmits the special telephone number, it is connected to voice messaging system 170. Voice messaging system 170 then plays the voice announcement, collects the called telephone number and data message. Voice messaging system 170 then interacts with switching office 100 in well known ways in the art to transfer the call to the called telephone link and to output the data message as touch tone digits that are converted by DTMF receiver 162 for central processor 108. In addition, voice messaging system 170 could use other well known data links to central processor 108 to transfer the digits of the data message to central processor 108. Central processor 108 is responsive to this data message to transfer the message to data transmitter 120 which transmits it on the telephone link.

The fourth mechanism for switching office 100 receiving information that is to be transmitted on an analog telephone link during the silent interval ringing is to receive that information from an ISDN link. Assume that link 101 rather than an analog telephone link is an ISDN basic rate interface (BRI) link. Terminal 166 includes the message that it wished to have sent as a data message on the called analog link into the setup message in an information element (IE). The setup message is processed by central processor 108 in a manner well known in the art. Central processor 108 retrieves the message from the IE and transmits this message to data transmitter 120 which in turn transmits it on the analog telephone link.

FIGS. 2, 3, 4, and 5 illustrate the operations performed by a switching office in providing the four mechanisms for implementing the data message feature. Blocks 206–226 of FIG. 2 implement the first mechanism, blocks 301–316 of FIG. 3 implement the second mechanism, blocks 401–413 of FIG. 4 implement the fourth mechanism. Blocks 502–516 of FIG. 5 implement the third mechanism, and FIG. 6 illustrates a second embodiment of the third mechanism where a voice messaging system is providing some of the operations for the third mechanism. Central control 109 of FIG. 1 maintains in memory tables which define the features for each telephone link connected to switching office 100 and each special telephone number. Decision block 201 of FIG. 2 determines if an incoming call to switching office 100 is directed to the dedicated data message telephone number. If the answer is yes, control is transferred to decision block 500 of FIG. 5. If the answer is no in decision block 201, control is transferred to decision block 202 which determines if the called link has the data message feature. If the answer is yes, decision block 204 determines if the incoming call is being received on an ISDN link. If the answer is yes, control is transferred to block 401 of FIG. 4. If the answer in decision block 204 is no, control is transferred to decision block 206 which determines if a tone is used to alert the caller of the feature. If the answer in decision block 206 is yes, block 207 transmits a tone to the calling party utilizing tone circuit 164. Block 208 then waits for a first predetermined amount of time to give the calling party time to recognize the tone and transfers control to block 209 which removes the tone. After execution of block 209, control is transferred to block 216 that sets a timer for a second predetermined amount of time. This second predetermined amount of time is the time allotted for receiving the first character of the data message. Decision block 217 then determines if the first data message character has been received. If the answer is no, decision block 218 determines if the timer has elapsed. If the answer is no, control is transferred back to decision block 217. If the answer in decision block 218 is yes, block 219 sets up a call path between the incoming call and the called telephone link. Block 219 also applies ringing to the called telephone link.

Returning to decision block 217, if the answer is yes, block 221 stores the character in the data message which is being formed. Control is then transferred to decision block 222 which determines if there is another character to read. Decision block 222 will transfer control to block 226 if another character is not received within the second predetermined amount of time. If a character is received, control is transferred to decision block 223 which determines if the termination character of the data message was received. The termination character may advantageously be the "#" character. If the answer is yes, control is transferred to block 226. If the answer is no in decision block 223, control is transferred to decision block 224. Decision block 224 determines if the characters received from the incoming call exceed the allowable length of a data message. If the answer is no in decision block 224, control is transferred back to block 221. If the answer is yes in decision block 224, control is transferred to block 226 which establishes the call path between the incoming call and the called telephone link and sends the data message with the ringing signal on the called telephone link.

Figure 3:
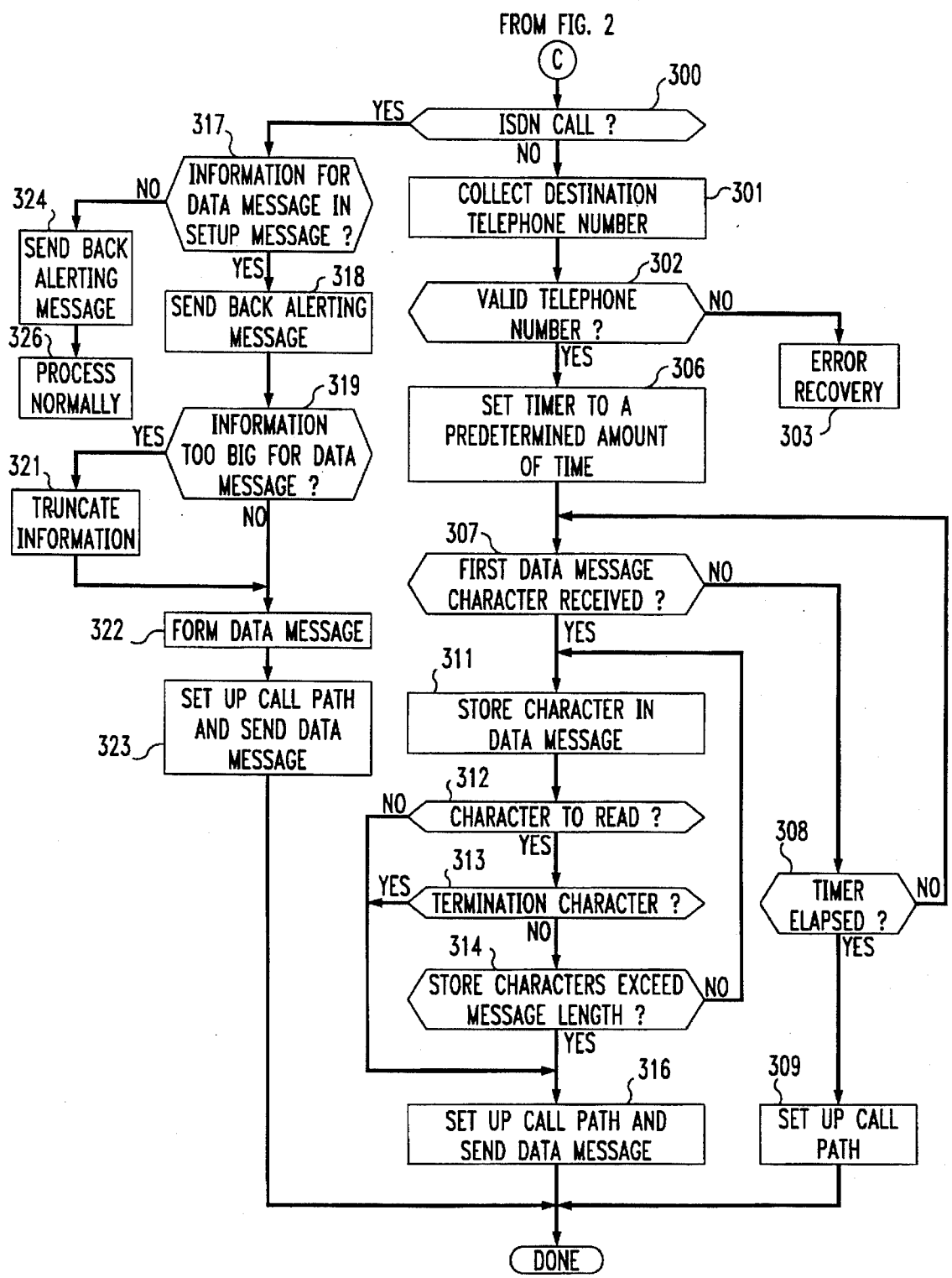

Returning to decision block 203, if the answer is yes to the question that the calling link has the data message feature, block 300 of FIG. 3 determines if the call is an ISDN call. If the answer is yes, control is transferred to block 317. If the answer is no, block 301 is executed to collect the destination telephone number being inputed on the incoming call link. Decision block 302 determines if this destination telephone number is a valid telephone number. If it is not, control is transferred to block 303 which performs error recovery. If the telephone number is a valid telephone number, control is transferred to block 306. Block 306 sets a timer for a predetermined amount of time. This predetermined amount of time is the time allotted for receiving the first character of the data message. Decision block 307 then determines if the first data message character has been received. If the answer is no, decision block 308 determines if the timer has elapsed. If the answer is no, control is transferred back to decision block 307. If the answer in decision block 308 is yes, block 309 sets up a call path between the incoming call and the called telephone link. Block 309 also applies ringing to the called telephone link.

Returning to decision block 307, if the answer is yes, block 311 stores the character in the data message which is being formed. Control is then transferred to decision block 312 which determines if there is another character to read. Decision block 312 will transfer control to block 316 if another character is not received within the predetermined amount of time. If a character is received, control is transferred to decision block 313 which determines if the termination character of the data message was received. If the answer is yes, control is transferred to block 316. If the answer is no in decision block 313, control is transferred to decision block 314. Decision block 314 determines whether the characters received from the incoming call exceed the allowable length of a data message. If the answer is no in decision block 314, control is transferred back to block 311. If the answer is yes in decision block 314, control is transferred to block 316 which establishes the call path between the incoming call and the called telephone link and sends the stored digits in the data message with the ringing signal on the called telephone link.

Returning to decision block 300, if the answer is yes, decision block 317 determines if there is information for a data message in the setup message. If the answer is no, control is transferred to block 324 which sends an alerting message back to the calling terminal, and block 326 processes the call in the normal manner. If the answer in decision block 317 is yes, block 318 sends back an alerting message. Decision block 319 then determines if the information contained in the setup message is too large for a data message. If the answer is yes, block 321 truncates the information so that it fits into the space allotted for information in the data message. Regardless, if block 321 is executed, block 322 eventually executes and forms a data message using the information that was contained in the setup message. Block 323 then sets up a call path between the incoming call and the called telephone link and sends the data message on the called telephone link prior to ringing.

Figure 2:
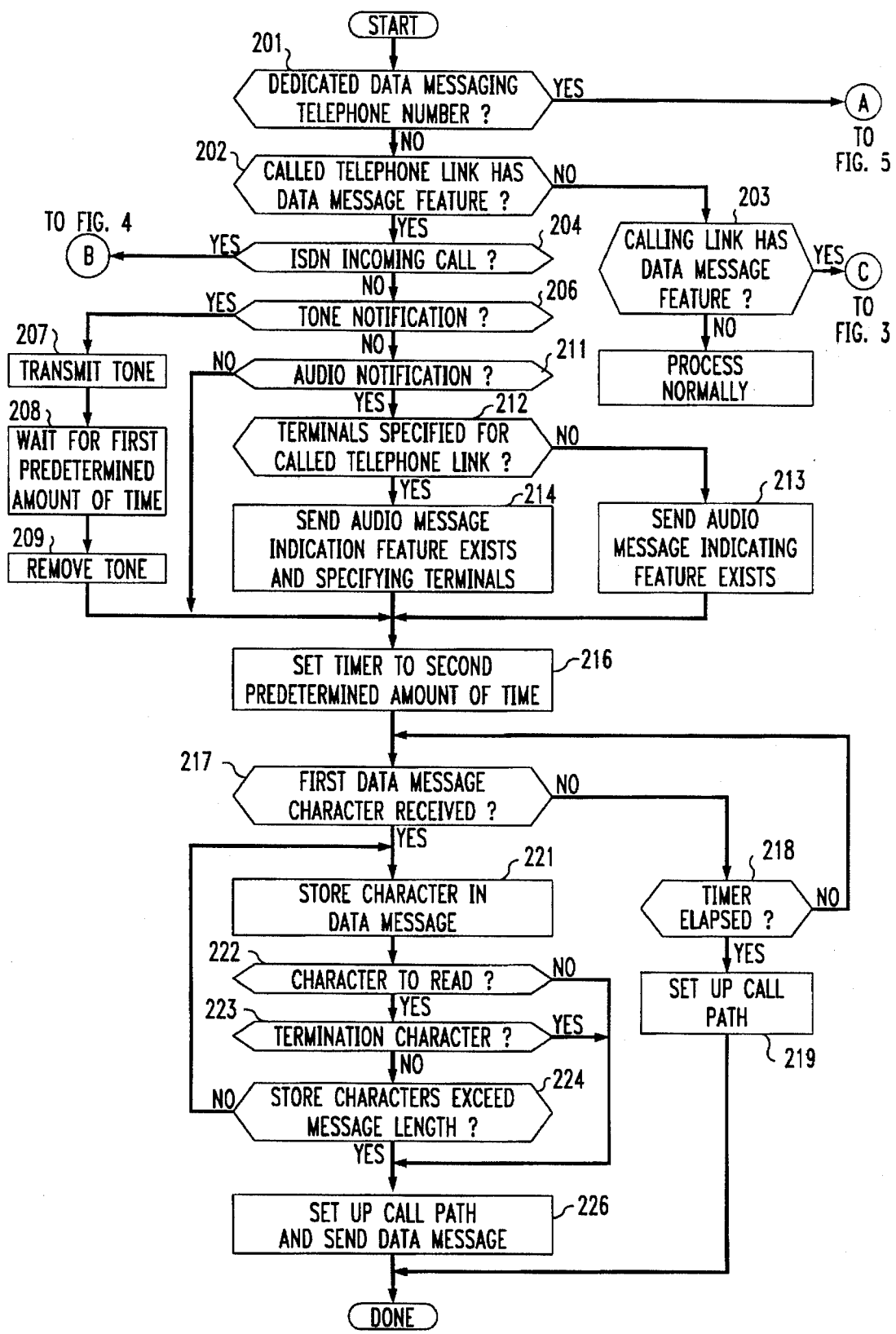
FIGS. 2, 3, 4, and 5 illustrate, in flow chart form, operations performed by a switching office.
Figure 4:
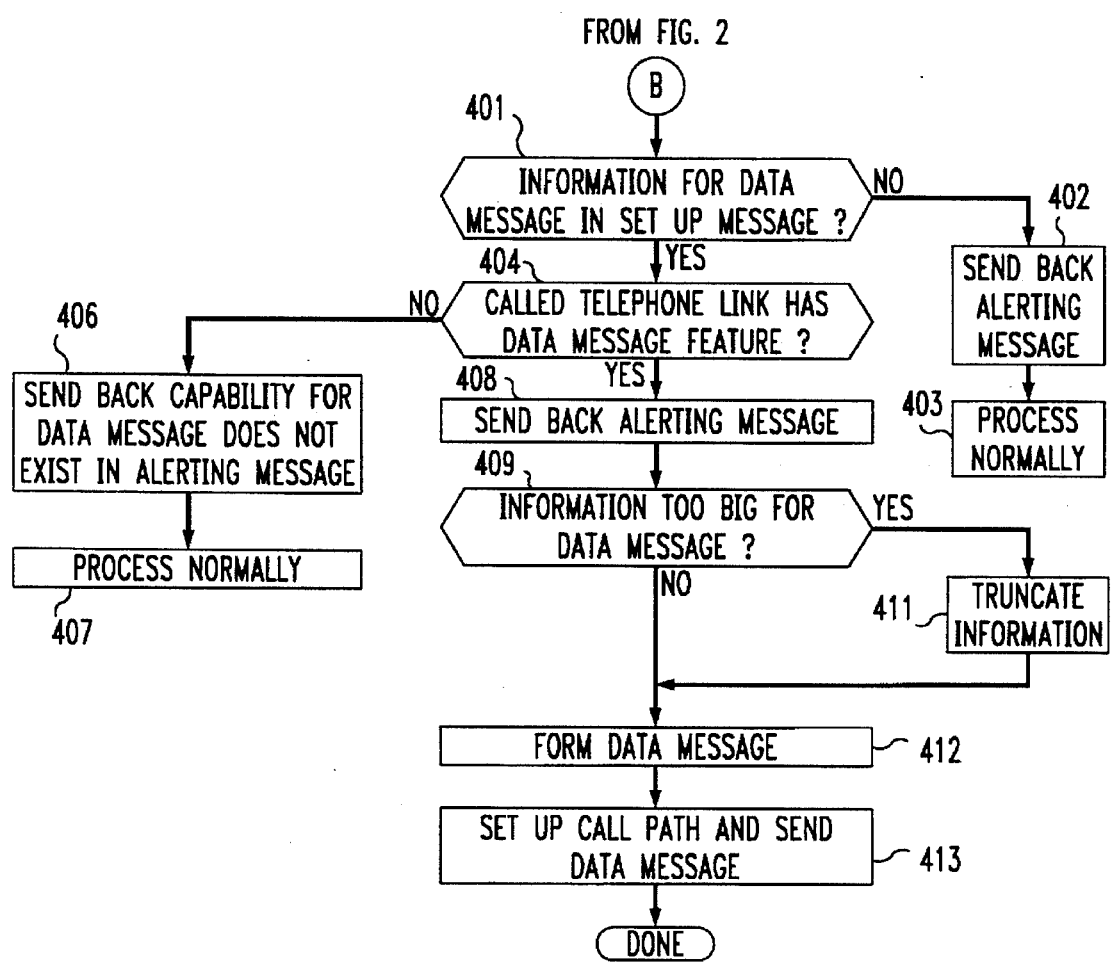

Returning to decision block 204 of FIG. 2, if the incoming call is an ISDN call, control is transferred to decision block 401 of FIG. 4 which determines if there is information for a data message in an IE of the setup message for the incoming call. If the answer is no, control is transferred to block 402 that sends back an alerting message, and block 403 then processes the call in a normal manner. If the answer in decision block 401 is yes, decision block 404 determines if the called telephone link has the data message feature. If the answer is no, an alerting message is sent back to the calling terminal but the alerting message includes information that informs the calling terminal that the called terminal does not have the data message capability. Block 407 is then executed to process the call in the normal manner.

Returning to decision block 404, if the answer is yes, 408 sends back an alerting message to the calling terminal and transfers control to decision block 409. The latter decision block determines if there are more characters specified in the data message information then a data message can transfer. If the answer is yes, block 411 truncates the information so it fits into the data message. Whether or not block 411 is executed, block 412 forms a data message. Block 413 sets up a call path and sends the data message on the called telephone link.

Figure 5:
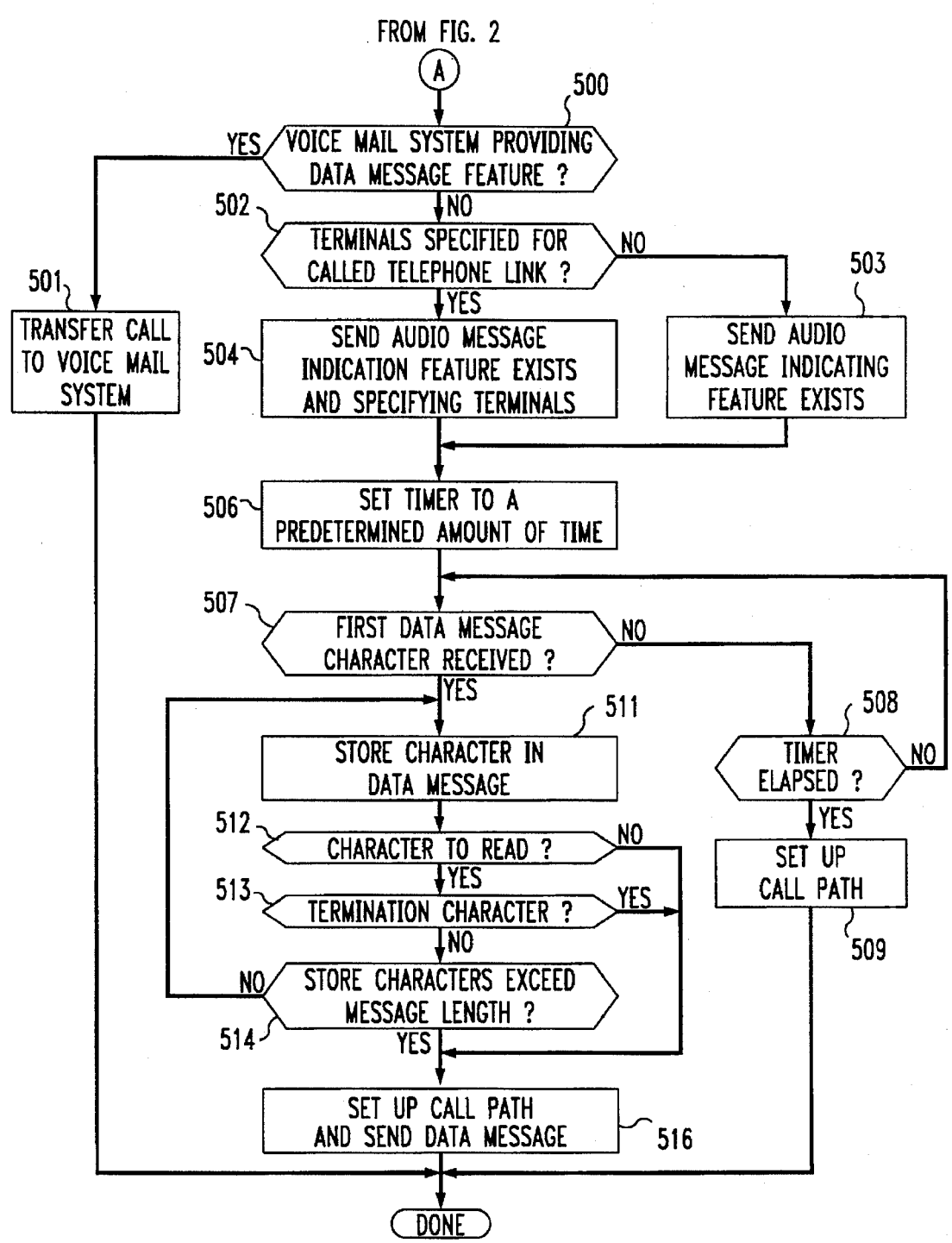
Figure 6:
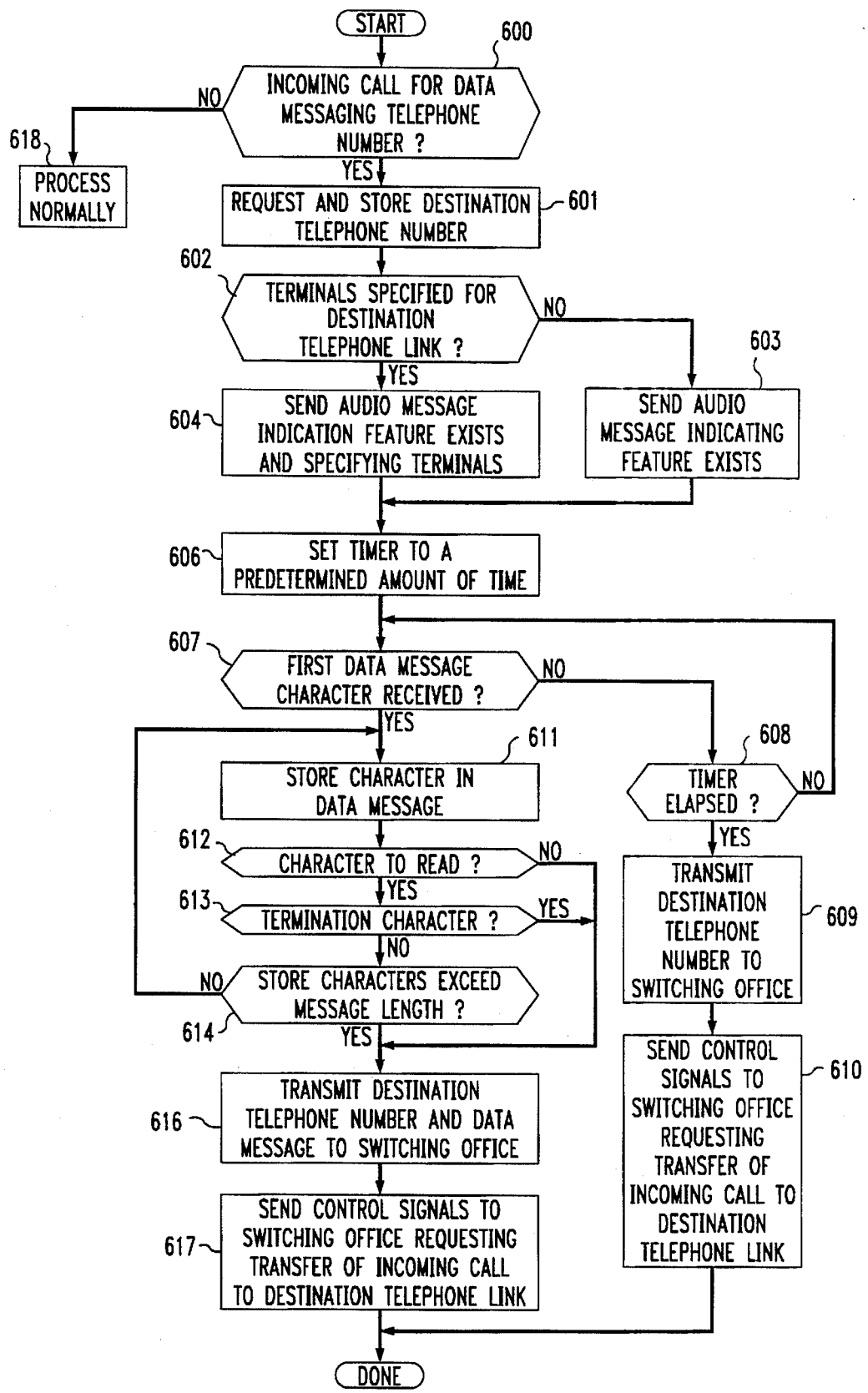
FIG. 6 illustrates, in flow chart form, operations performed by a voice mail system.

Returning to decision block 201 of FIG. 2, if the call is directed to the dedicated data messaging telephone number, control is transferred to decision block 500 of FIG. 5. Decision block 500 determines whether the third mechanism is implemented within switching office 100 or if an adjunct system such as voice messaging system 170 is utilized. If a voice mail system is utilized to provide many of the operations of the third mechanism, control is transferred to block 501 which transfers the call to the voice mail system. In the process of transferring the call to the voice mail system, switching office 100 transmits information designating the called telephone number utilizing well known transmission methods in the art. If the answer in decision block 500 is no, decision block 502 determines if terminal information is specified within the translation tables maintained by switching office 100 for the terminals connected to the called telephone link. If the answer is no in decision block 502, block 503 utilizes voice response circuit 163 to send an audio message to the calling party indicating that the data message feature exists. If the answer in decision block 502 is yes, block 504 sends an audio message indicating that the feature exists and identities of the terminals and their respective codes. After execution of either block 503 or 504, block 506 is executed. Block 506 sets a timer for a predetermined amount of time. This predetermined amount of time is the time allotted for receiving the first character of the data message. Decision block 507 then determines if the first data message character has been received. If the answer is no, decision block 508 determines if the timer has elapsed. If the answer is no, control is transferred back to decision block 507. If the answer in decision block 508 is yes, block 509 sets up a call path between the incoming call and the called telephone link. Block 509 also applies ringing to the called telephone link.

Returning to decision block 507, if the answer is yes, block 511 stores the character in the data message which is being formed. Control is then transferred to decision block 512 which determines if there is another character to read. Decision block 512 will transfer control to block 516 if another character is not received within the predetermined amount of time. If a character is received, control is transferred to decision block 513 which determines if the termination character of the data message was received. If the answer is yes, control is transferred to block 516. If the answer is no in decision block 513, control is transferred to decision block 514. Decision block 514 determines whether the characters received from the incoming call exceed the allowable length of a data message. If the answer is no in decision block 514, control is transferred back to block 511. If the answer is yes in decision block 514, control is transferred to block 516 which establishes the call path between the incoming call and the called telephone link and sends the data message with the ringing signal on the called telephone link.

Returning to decision block 500 of FIG. 5, if the answer is yes, the incoming call is transferred to voice mail system 170. FIG. 6 illustrates, in flow chart form, the operations performed by voice mail system 170 in conjunction with the data message feature. Decision block 600 determines if the incoming call is directed to the data messaging telephone number. If the answer is no, control is transferred to block 618 which performs normal processing. If the answer is yes, control is transferred to block 601 which requests that the calling party enter the destination telephone number and then stores that destination telephone number before transferring control to decision block 602. Decision block 602 determines if terminal information is specified for the destination telephone link. If the answer is no, control is transferred to block 603 which sends an audio message indicating that the data messaging feature exists. If the answer is yes in decision block 602, block 604 sends an audio message indicating the data message feature exists and specifying the terminals and their codes. Whether block 603 or block 604 is executed, control is passed to block 606. Block 606 sets a timer for a predetermined amount of time. This predetermined amount of time is the time allotted for receiving the first character of the data message. Decision block 607 then determines if the first data message character has been received. If the answer is no, decision block 608 determines if the timer has elapsed. If the answer is no, control is transferred back to decision block 607. If the answer in decision block 608 is yes, control is transferred to block 609 which indicates that the timer elapsed before a first data message character was received. Also, block 609 transmits the destination telephone number to switching office 100, and block 610 transmits control signals to switching office 100 to cause the transfer of the incoming call to the destination telephone link.

Returning to decision block 607, if the answer is yes, block 611 stores the character in the data message which is being formed. Control is then transferred to decision block 612 which determines if there is another character to read. Decision block 612 will transfer control to block 616 if another character is not received within the predetermined amount of time. If a character is received, control is transferred to decision block 613 which determines if the termination character of the data message was received. If the answer is yes, control is transferred to block 616. If the answer is no in decision block 613, control is transferred to decision block 614. Decision block 614 determines whether the characters received from the incoming call exceed the allowable length of a data message. If the answer is no in decision block 614, control is transferred back to block 611. If the answer is yes in decision block 614, control is transferred to block 616. Block 616 utilizes either the first or second mechanism to transmit the destination telephone number and data message to switching office 100. Switching office 100 then sets up a call to the destination telephone link and transmits the data message on that link. Finally, block 617 sends control signals to switching office 100 requesting that the incoming call be transferred to the destination telephone link.

It is to be understood that the above-described embodiments are merely illustrative of the principles of the invention and that other arrangements may be devised by those skilled in the art without departing from the spirit and scope of the invention.

The invention claimed is:

1. An apparatus for transmitting a data message during the silent intervals of ringing on an analog telephone link for an incoming telephone call from an originating telephone link, comprising:

means for accepting information from the originating telephone link;

means for inserting the information into the data message;

means for transmitting the data message on the analog telephone link during the silent intervals of ringing;

the means for accepting information comprises means for determining that the data message can be transmitted on the analog telephone link in response to the incoming call being directed to the analog telephone link;

means for receiving the information in response to the determination that the data message can be transmitted on the analog telephone link; and the means for receiving comprises means for transmitting a tone on the telephone link to indicate that the analog telephone link can accept the data message.

2. The apparatus of claim 1 wherein the means for accepting comprises:

means for transmitting a message on the originating telephone link defining that the analog telephone link can accept the data message; and means for receiving the information.

3. The apparatus of claim 2 wherein the last-mentioned transmitted message can be a voice message.

4. The apparatus of claim 3 wherein the voice message defines terminals connected to the analog telephone link.

5. An apparatus for transmitting a data message during the silent intervals of ringing on an analog telephone link for an incoming telephone call from an originating telephone link, comprising:

means for accepting information from the originating telephone link;

means for inserting the information into the data message;

means for transmitting the data message on the analog telephone link during the silent intervals of ringing;

the means for accepting information comprises means for determining that the information can be accepted from the originating telephone link upon the incoming call being received on the originating telephone link; and means for receiving the information in response to the determination that the information can be accepted from the originating telephone link.

6. The apparatus of claim 5 wherein the originating telephone link is an ISDN telephone link and the information is transmitted in a ISDN set up message for the incoming call.

7. An apparatus for transmitting a data message during the silent intervals of ringing on an analog telephone link for an incoming telephone call from an originating telephone link, comprising:

means for accepting information from the originating telephone link;

means for inserting the information into the data, message;

means for transmitting the data message on the analog telephone link during the silent intervals of ringing;

the means for accepting comprises means responsive to the incoming call being directed to a predefined telephone number for receiving a telephone number identifying the analog telephone link and the information.

8. The apparatus of claim 7 wherein the means for receiving comprises means for transmitting a message requesting the telephone number and the information.

9. The apparatus of claim 8 wherein the last-mentioned transmitted message can be a voice message.

10. The apparatus of claim 9 wherein the voice message defines terminals connected to the analog telephone link.

11. An apparatus for transmitting a data message during the silent intervals of ringing on an analog telephone link for an incoming telephone call from an originating telephone link, comprising:

means for accepting information from the originating telephone link;

means for inserting the information into the data message;

means for transmitting the data message on the analog telephone link during the silent intervals of ringing;

the means for accepting comprises means responsive to the incoming call being directed to a predefined telephone number for transferring the incoming call to an adjunct system wherein the adjunct system comprises means for receiving a telephone number identifying the analog telephone link and the information.

12. The apparatus of claim 11 wherein the adjunct system further comprises means for communicating the telephone number and information to the apparatus by the adjunct system; and the means for transmitting in the apparatus comprises means responsive to the communicated telephone number and information for forming the communicated telephone number and information into the data message.

13. The apparatus of claim 12 wherein the receiving means comprises means for transmitting a message requesting the telephone number and the information.

14. The apparatus of claim 13 wherein the last-mentioned a transmitted message can be a voice message.

15. The apparatus of claim 9 wherein the voice message defines terminals connected to the analog telephone link.

16. A method for transmitting a data message by a switching office during the silent intervals of ringing on an analog telephone link for an incoming telephone call from an originating telephone link, the method comprising the steps of:

accepting information from the originating telephone link;

inserting the information into the data message;

transmitting the data message on the analog telephone link during the silent intervals of ringing;

the step of accepting information comprises the steps of determining that the data message can be transmitted on the analog telephone link in response to the incoming call being directed to the analog telephone link;

receiving the information in response to the determination that the data message can be transmitted on the analog telephone link; and the step of receiving comprises the step of transmitting a tone on the originating telephone link to indicate that the analog telephone link can accept the data message.

17. A method for transmitting a data message by a switching office during the silent intervals of ringing on an analog telephone link for an incoming telephone call from an originating telephone link, the method comprising the steps of:

accepting information from the originating telephone link;

inserting the information into the data message;

transmitting the data message on the analog telephone link during the silent intervals of ringing;

the step of accepting comprises the steps of transmitting a message on the originating telephone link defining that the analog telephone link can accept the data message; and receiving the information.

18. The method of claim 17 wherein the last mentioned transmitted message is a voice message.

19. The method of claim 18 wherein the voice message defines terminals connected to the analog telephone link.

20. The method of claim 16 wherein the step of accepting information comprises the steps of determining that the information can be accepted from the telephone link upon the incoming call being received on the originating telephone link; and receiving the information in response to the determination that the information can be accepted from the originating telephone link.

21. The method of claim 20 wherein the originating telephone link is an ISDN telephone link and the information is transmitted in an ISDN set up message for the incoming call.

22. A method for transmitting a data message by a switching office during the silent intervals of ringing on an analog telephone link for an incoming telephone call from an originating telephone link, the method comprising the steps of:

accepting information from the originating telephone link;

inserting the information into the data message;

transmitting the data message on the analog telephone link during the silent intervals of ringing;

the step of accepting comprises the step of receiving a telephone number identifying the analog telephone link and the information in response to the incoming call being directed to a predefined telephone number.

23. The method of claim 22 wherein the step of receiving comprises the step of transmitting a message requesting the telephone number and the information.

24. The method of claim 23 wherein the last mentioned transmitted message is a voice message.

25. The method of claim 24 wherein the voice message defines terminals connected to the analog telephone link.

26. A method for transmitting a data message by a switching office during the silent intervals of ringing on an analog telephone link for an incoming telephone call from an originating telephone link, the method comprising the steps of:

accepting information from the originating telephone link;

inserting the information into the data message;

transmitting the data message on the analog telephone link during the silent intervals of ringing;

the step of accepting comprises the step of transferring the incoming call by the switching office to an adjunct system in response to the incoming call being directed to a predefined telephone number; and the step of receiving by the adjunct system a telephone number identifying the analog telephone link and the information.

27. The method of claim 26 further comprises the step of communicating the telephone number and information to the switching office by the adjunct system; and the step of transmitting comprises the step of forming in response to the communicated telephone number and information the communicated telephone number and information into the data message on the analog telephone link.

28. The method of claim 27 wherein the step of receiving comprises the step of transmitting a message requesting the telephone number and the information.

29. The method of claim 28 wherein the last mentioned transmitted message is a voice message.

30. The method of claim 24 wherein the voice message defines terminals connected to the analog telephone link.

* * * * *